United States Patent Office 3,021,354
Patented Feb. 13, 1962

3,021,354
2-CHLORO-4,6-DIMETHYL-2-OXO-1,3,2-DIOXAPHOSPHORINANES
William M. Lanham, Charleston, W. Va., assignor to Union Carbide Corporation, a corporation of New York
No Drawing. Filed July 8, 1954, Ser. No. 442,174
1 Claim. (Cl. 260—461)

This invention relates to the production of a novel class of 2-halo-2-oxo-1,3,2-dioxaphosphorinanes having a structure corresponding to the formula:

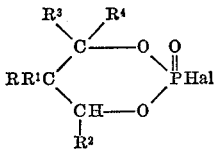

wherein R, $R^1$ and $R^3$, respectively, represents hydrogen or an alkyl group; $R^2$ and $R^4$, respectively, represents an alkyl group; and Hal represents a halogen of the class consisting of chlorine and bromine. Preferably $R^2$ and $R^4$, respectively, represents alkyl groups having from 1 to 20 carbon atoms.

These new compounds can be prepared by reacting a phosphoryl halide, such as phosphoryl chloride or phosphoryl bromide, with a disecondary or secondary-tertiary alkane-1,3-diol. The novel products of the invention are useful pesticides. They also react with monohydric and polyhydric alcohols, phenols, thiophenols, mercaptans, the alkali metal salts of these compounds, amines, ammonia and epoxides, to produce compounds that have potential utility as plasticizers, pesticides, lubricants, oil and gasoline additives, surface active agents and assistants in the textile industry.

The novel process by which the novel products of the invention are made may be represented by the equation:

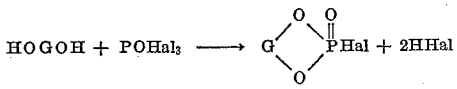

where G represents the hydrocarbon residue of a disecondary or a secondary-tertiary alkane-1,3-diol.

The production of these new compounds is surprising since it would be expected that the compounds, as formed, would react with the hydrogen halide concurrently formed to open the dioxaphosphorinane ring and form a probably unstable open chain compound according to the typical equation:

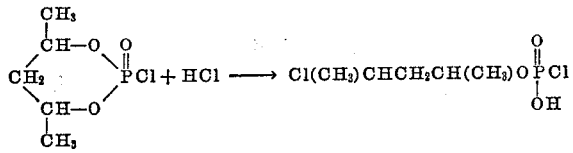

The production of a stable substituted 2-halo-2-oxo-1,3,2-dioxaphosphorinane by the reaction of a phosphoryl halide and a secondary-tertiary alkane-1,3-diol is still more surprising since it is well known that a tertiary chloride is formed by the reaction of an acyl chloride and a tertiary alcohol.

The disecondary alkane-1,3-diols are readily made, as by reacting ketene or a ketene homologue with any ketone having an alpha-hydrogen atom, followed by rearrangement and subsequent hydrogenation of the resultant diketone. Where the ketone is symmetrical, only one product is obtained. If the ketone is unsymmetrical and contains an alpha-hydrogen on either side of the carbonyl group, then two isomers are obtained. When there is only one alpha-hydrogen, only one product is obtained even in the case of an unsymmetrical ketone.

Secondary-tertiary alkane-1,3-diols can be prepared by the aldol condensation of a ketone containing an alpha-hydrogen atom, or by the cross-condensation of two different ketones, each of which has one or more alpha-hydrogen atoms, followed by hydrogenation of the resultant ketol.

It has been found that the reaction between the phosphoryl halide and a disecondary alkane-1,3-diol proceeds smoothly with the production of approximately quantitive yields of the desired 2-halo-2-oxo-1,3,2-dioxaphosphorinane. It often is convenient to add the phosphoryl chloride or bromide slowly to an agitated suspension or solution of the diol in an inert solvent for the desired product. If desired the 1,3-diol, or a solution of the diol in an inert solvent, can be added in successive small increments to the phosphoryl halide, or to a solution thereof in an inert solvent. Where the desired product is a liquid, no solvent is necessary. When used, any substantially water-free inert solvent can be employed, such as benzene, toluene, the xylenes, ethylene dichloride, heptane, hexane, ethyl ether, butyl ether, and the like.

The reaction preferably is conducted at temperatures around 25° C. under 500 mm. of mercury pressure. However, temperatures within the range from about —20° C. to about 60° C. can be used, and the reaction can be conducted at atmospheric pressure or higher, in which case the pressure subsequently is reduced to facilitate the removal of the by-product hydrogen halide. Equimolar quantities of the reactants enter into the reaction, and it has been found that these are desirable proportions to use. However, an excess of either reactant can be employed, although a considerable excess of the diol can present a separation problem. The novel products can be purified by vacuum distillation or by crystallization. However, this usually is not necessary.

Among disecondary alkane-1,3-diols useful in the process may be mentioned the following:

2,4-hexanediol
3-methyl-2,4-pentanediol
3-methyl-2,4-hexanediol
2,4-heptanediol
3-ethyl-2,4-pentanediol
5-methyl-2,4-hexanediol
3,3-dimethyl-2,4-pentanediol
6-methyl-2,4-heptanediol
3-isopropyl-2,4-pentanediol
3-isopropyl-6-methyl-2,4-heptanediol
2,4-nonanediol
3-butyl-2,4-pentanediol
5,5-dimethyl-2,4-hexanediol
3,3,5-trimethyl-2,4-hexanediol
3,3,5,5-tetramethyl-2,4-hexanediol
2,4-decanediol
3-(2-ethylhexyl)-2,4-pentanediol
7-ethyl-2,4-undecanediol
7-ethyl-3-isopropyl-2,4-undecanediol
3-(2-ethylhexyl)-6-methyl-2,4-heptanediol
7-ethyl-3-(2-ethylhexyl)-2,4-nonanediol
7-ethyl-3-(2-ethylbutyl)-2,4-undecanediol
4-methyl-3,5-heptanediol
4,4-dimethyl-3,5-heptanediol
2,4-dimethyl-3,5-heptanediol
13,15-dotriacontanediol It is sometimes preferred to conduct the reaction of phosphoryl halides and secondary-tertiary alkane-1,3-diols in the presence of a hydrogen chloride sequestering agent, such as the tertiary amines, e.g., pyridine, N,N-dimethylaniline, trimethylamine, tributylamine and the like. However, this modification of the process is usually not necessary and the reaction may be conducted at atmospheric or under reduced pressures.

The reaction between the secondary-tertiary diols and phosphoryl halide can be conducted at temperatures within the range from about −20° C. to about +60° C., although those within the range from 0° C. to 25° C. are preferred. The same inert solvents used in connection with the reaction of phosphoryl halides with a di-secondary alkanediol also can be used in the case of the secondary-tertiary diols where a solvent is needed or desired.

The novel products of this reaction can be purified by crystallization or by distillation under high vacuum, preferably using a falling-film type still. Where the product is sufficiently insoluble in water, the reaction mixture can be washed with water, and the washed product stripped by vacuum distillation to secure a satisfactory residue product.

Among secondary-tertiary alkane-1,3-diols useful in the process may be mentioned:

2,3-dimethyl-2,4-pentanediol
4-methyl-2,4-hexanediol
3,4-dimethyl-2,4-hexanediol
3-methyl-3,5-heptanediol
2,3-dimethyl-2,4-hexanedoil
4-ethyl-2,4-hexanediol
3-ethyl-4-methyl-3,5-heptanediol
3-ethyl-2-methyl-2,4-pentanediol
4-methyl-2,4-heptanediol
4-methyl-3-propyl-2,4-heptanediol
4-methyl-4,6-nonanediol
3-isopropyl-2-methyl-2,4-pentanediol
4,6-dimethyl-2,4-heptanediol
4,6-dimethyl-3-isopropyl-2,4-heptanediol
2,4,8-trimethyl-4,6-nonanediol
2,6-dimethyl-3-isopropyl-2,4-heptanediol
4-isobutyl-6-methyl-2,4-heptanediol
2,8-dimethyl-4-isobutyl-5-isopropyl-4,6-nonanediol
4-ethyl-3-methyl-2,4-hexanediol
3,4-dimethyl-3,5-heptanediol
3,4-dimethyl-2,4-heptanediol
3-ethyl-4-methyl-2,4-hexanediol
3-ethyl-3,5-octanediol
3,4,6-trimethyl-2,4-heptanediol
5,7-dimethyl-3,5-octanediol
3-isopropyl-4-methyl-2,4-hexanediol
3,7-dimethyl-3,5-octanediol The following examples serve to illustrate the invention:

*Example 1*

To 1522 grams (9.91 mols) of phosphoryl chloride held at 25° C. under an absolute pressure of 500 mm. of mercury, there were added during 1.5 hours dropwise 1032 grams (9.91 mols) of 2,4-pentanediol. After the addition the reaction mixture was maintained at 25° C. under the said pressure for 1 hour, then at the same temperature under 350 mm. of mercury for 1 hour, and finally at that temperature under 5 mm. of mercury for 4 hours. The residual product, 2-chloro-4,6-dimethyl-2-oxo-1,3,2-dioxaphosphorinane, was recovered in the form of a yellow fluid residue amounting to 1821 grams (theory=1831 grams). It had the following properties: equivalent weight (by saponification)=93.2 (theory= 92.3); $n_D^{30}$=1.4524. It had the following analysis:

|  | Observed | Theroy |
| --- | --- | --- |
| Percent Cl | 18.97 | 19.21 |
| Percent P | 16.86 | 16.78 |
| Percent C | 33.7 | 32.55 |
| Percent H | 6.0 | 5.46 |

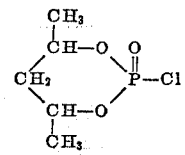

*Example 2*

There were added dropwise 104 grams (1 mol) of 2,4-pentanediol to 153 grams (1 mol) of phosphoryl chloride maintained at a reaction temperature of 25° C. under an absolute pressure of 500 mm. of mercury. After an additional reaction time of 17 hours at 25° C. under pressure ranging from 500 mm. of mercury to 5 mm. of mercury, there were secured 180 grams (theory=184 grams) of 2-chloro-4,6-dimethyl-2-oxo-1,3,2-dioxaphosphorinane in the form of a liquid residue having an equivalent weight (by saponification) of 96.0 (theory=92.3).

*Example 3*

To 307 grams (2 mols) of phosphoryl chloride maintained at from 0° C. to 5° C. under an absolute pressure of 500 mm. of mercury there were added with agitation during 45 minutes 236 grams (2 mols) of 2-methyl-2,4-pentanediol. After maintaining these conditions for another hour, then at 15° C. under 350 mm. pressure for 1 hour and finally at 25° C. under 5 mm. of mercury pressure for 3 hours, there were obtained 398 grams (theory=397 grams) of an almost colorless fluid residue. A 100 gram portion of the latter was purified by crystallization from 200 cc. of ethyl ether at −40° C. The white crystals thus formed were removed by filtration, and were stripped by distillation at a temperature of 35° C. under 1 mm. of mercury pressure, yielding 60 grams of colorless, fluid residue having the following properties: freezing point=21.5° C.; equivalent weight (by saponification)=98.3 (theory=99.3). It had the following analysis:

|  | Observed | Theory |
| --- | --- | --- |
| Percent Cl | 17.44 | 17.85 |
| Percent P | 15.53 | 15.51 |
| Percent C | 35.92 | 36.28 |
| Percent H | 6.44 | 6.09 |

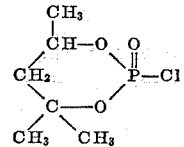

*Example 4*

To an agitated solution of 306 grams (substantially 2 mols) of phosphoryl chloride in 2000 cc. of ethyl ether maintained at a temperature ranging from 0° C. to 5° C., there were added a solution of 236 grams (2 mols) of 2-methyl-2,4-pentanediol and 484 grams (4 mols) of N,N-dimethylaniline during 1.5 hours with cooling. The reaction mixture then was allowed to warm to 25° C. and stirred for 3 additional hours, after which it was filtered, and the filtrate was stripped by distillation to a kettle temperature of 35° C. under less than 2 mm. of mercury pressure. The residue then was stripped at 56° C. under a pressure of 1.6 mm. of mercury, using a falling-film type still, and then was distilled at the said temperature under a pressure of 0.03 mm. of mercury in the same apparatus. The 193 grams of 2-chloro-2-oxo-4,4,6-trimethyl-1,3,2-dioxaphosphorinane was recovered as a colorless distillate having the following properties: $n_D^{30}$=1.4663; equivalent weight (by saponification)=97.2

(theory=99.3); percent Cl=18.30 (theory=17.85).

This application is a continuation-in-part of my pending application, Serial No. 340,400, filed March 4, 1953.

The invention is susceptible of modification within the scope of the appended claim.

I claim:

As a new product, 2-chloro-4,6-dimethyl-2-oxo-1,3,2-dioxaphosphorinane.

References Cited in the file of this patent

UNITED STATES PATENTS 2,661,365    Gamrath et al. _____ Dec. 1, 1953

OTHER REFERENCES

J. Am. Chem. Soc., vol. 72, pages 5491–7, December 1950, 260–461.3. (Copy in Sci. Library) (Author: Lucas et al.)